United States Patent [19]

Iwase et al.

[11] 3,974,303
[45] Aug. 10, 1976

[54] METHOD FOR FORMING COATING FILMS

[75] Inventors: Seigo Iwase; Osamu Isozaki; Naozumi Iwasawa; Tadashi Watanabe, all of Hiratsuka, Japan

[73] Assignee: Kansai Paint Company, Ltd., Japan

[22] Filed: July 22, 1974

[21] Appl. No.: 490,753

[30] Foreign Application Priority Data
July 27, 1973 Japan.................................. 48-84169

[52] U.S. Cl.................................... 427/27; 427/44; 427/54; 427/185; 427/195
[51] Int. Cl.² ...................... B05D 3/06; B05B 5/02
[58] Field of Search..................... 117/17, 21, 93.31; 427/54, 35, 27, 44, 195, 185, 43

[56] References Cited
UNITED STATES PATENTS

| | | | |
|---|---|---|---|
| 3,090,698 | 5/1963 | Wilson............................. | 117/93.31 |
| 3,187,162 | 6/1965 | Hoso et al........................... | 117/21 |
| 3,248,253 | 4/1966 | Barford et al....................... | 117/17 |
| 3,409,280 | 11/1968 | Springett............................... | 263/6 |
| 3,549,403 | 12/1970 | Williams et al....................... | 427/32 |
| 3,598,626 | 8/1971 | Probst et al........................... | 117/17 |
| 3,647,520 | 3/1972 | Gor et al............................ | 117/93.31 |
| 3,711,391 | 1/1973 | Feinberg........................... | 117/93.31 |

*Primary Examiner*—Ralph Husack
*Attorney, Agent, or Firm*—Ostrolenk, Faber, Gerb & Soffen

[57] ABSTRACT

A method for forming coating films which can provide coating films having good surface appearance and being excellent in such properties as impact resistance, adhesion to the substrate article, flexibility and chemical resistance, said method comprising coating a powdery composition of a thermoplastic resin having 0.5 to 3.5 polymerizable unsaturated bonds per 1000 of the molecular weight on an article to be coated, heat-melting the powdery resinous composition, and curing the molten film under application of ionizing radiation or ultraviolet radiation.

19 Claims, No Drawings

METHOD FOR FORMING COATING FILMS

BACKGROUND OF THE INVENTION

1. Field of the Invention

This invention relates to a novel method for forming coating films by coating a powdery composition of a thermoplastic resin having polymerizable unsaturated bonds on an article to be coated, heat-melting the powdery resinous composition and curing the molten film under application of ionizing radiations or ultraviolet rays.

2. Description of the Prior Art

As one of conventional methods for forming coating films, there is known a method comprising coating a powdery resinous composition formed by incorporating a curing agent, a pigment and other additives into a powdery resin, on an article to be coated according to a customary coating technique, for example, electrostatic coating or fluidized bed coating, and heating the coated composition to effect melting and curing simultaneously. This known method is advantageous in that as the coating composition is free of a solvent, and air pollution owing to evaporation of a solvent is not caused to occur. However, since the melting and curing steps are simultaneously conducted by heating, this method is defective in that since the curing reaction partially proceeds at the melting stage and bubbles are formed by the condensation reaction caused at the curing stage, it is difficult to obtain coatings having good surface appearance.

As another known method for forming coating films, there can be mentioned a method in which ionizing radiations or ultraviolet rays are applied to a coated film including a resin having polymerizable unsaturated groups to cause a chemical polymerization reaction and effect curing. Most of paints used in this method are formed by dissolving a resin having polymerizable double bonds into a polymerizable monomer such as styrene and methyl methacrylate. When these paint compositions are used for formation of coating film, the monomer used as the solvent is evaporated at the curing step under application of ionizing radiations or ultraviolet rays. Therefore, this method is defective not only in that economical disadvantages are brought about by the evaporation loss of the monomer but also in that the evaporated monomer emits an offensive odor and causes air pollution. Further, when compositions of resins having polymerizable unsaturated bonds are cross-linked and cured under application of ionizing radiations or ultraviolet rays, it frequently happens that abrupt shrinkage is caused to occur at the cross-linking step. This shrinkage phenomenon causes formation of strains and distortions in the cured coating, resulting in insufficient impact resistance, reduction of adhesion of the coating to a substrate and degradation of flexibility of the coating.

It is therefore a primary object of this invention to provide a method for forming coating films, which can overcome the foregoing defects and difficulties involved in the conventional coating methods.

Another object of this invention is to provide a method for forming coating films which can give coating films having excellent surface appearance and being excellent in such properties as the impact resistance, the adhesion to a substrate, the flexibility, the chemical resistance and the like.

Still another object of this invention is to provide a method for forming coating films according to which coating films having excellent surface appearance can easily be prepared by application of ionizing radiations or ultraviolet rays without causing air pollution or the like.

SUMMARY OF THE INVENTION

In accordance with this invention, there is provided a method for forming coating films, which comprises coating a powdery composition of a thermoplastic resin having 0.5 to 3.5 polymerizable unsaturated bonds per 1000 of the molecular weight on an article to be coated, heat-melting the powdery resinous composition, and curing the molten film under application of an ionizing radiation or ultraviolet ray.

DETAILED DESCRIPTION OF THE PREFERRED EMBODIMENTS

It is indispensable that the powdery resinous composition to be used for formation of coating films in the method of this invention should include as a main resin component, a thermoplastic resin having 0.5 to 3.5 polymerizable unsaturated bonds per 1000 of the molecular weight. When a resin having less than 0.5 unsaturated bond per 1000 of the molecular weight is employed, the starting resin composition is very poor in the cross-linking property and the physical properties of the resulting cured coating film are inferior. When the number of unsaturated bonds is greater than 3.5 per 1000 of the molecular weight, a good cross-linking property can be obtained in the starting resinous composition, but reduction of the adhesion to a substrate, the impact resistance and the flexibility is observed in the resulting cured film. Further, it is preferred that the resin to be used in this invention is solid at room temperature and molten at a temperature ranging from 50° to 200°C., especially 60° to 120°C. In this invention, it is possible to lower the melting temperature of the resin by addition of a suitable plasticizer, if necessary.

Any thermoplastic resins can be used in this invention as long as the above-mentioned requirement of the number of polymerizable unsaturated bonds is satisfied. For example, the following resins can be preferably employed in this invention.

1. Vinyl and acrylic polymers having polymerizable unsaturated bonds at side chains thereof.
2. Polyesters and polyethers having polymerizable unsaturated bonds at side chains or terminal ends thereof.
3. Unsaturated polyesters synthesized by employing an unsaturated polybasic acid as a main polybasic acid component.
4. Unsaturated epoxy esters synthesized from an unsaturated acid and an epoxy resin.
5. Polyurethanes synthesized by employing an unsaturated acid or unsaturated alcohol as one component.
6. Melamine resins having unsaturated bonds introduced therein.
7. Oil-modified unsaturated alkyd resins and oil-modified unsaturated aminoalkyd resins.
8. Silicone-modified resins having polymerizable unsaturated bonds.

A thermoplastic resin such as mentioned above is incorporated with a plasticizer, a pigment, a filler, and other additives according to need, and the resulting composition is finely divided according to a known method such as a hot-dispersing method, a spray-drying method and the like. A powdery resinous composition to be used in this invention is thus formed. If the particle size of the powdery resinous composition is too large, close contact can hardly be obtained among the particles and it is difficult to obtain a uniform coating film by heat-melting of the composition. Accordingly, it is preferred to select an appropriate particle size, though the preferred particle size varies to some extent depending on the coating method. For example, it is desired that the particle size is smaller than 150 $\mu$ in the case of the fluidized bed coating method and the particle size is smaller than 100 $\mu$ in the case of the electrostatic coating method.

The so formed powdery thermoplastic resinous composition is coated on a substrate article to be coated, and this coating can be accomplished by any of known customary coating methods, for example, the fluidized bed coating method, the electrostatic fluidized bed coating method, the electrostatic coating method, the powder electrophoretic deposition method and the flame spray coating method. Then, the coated composition is heat-melted on the substrate at a temperature of 50° to 200°C., preferably 60° to 120°C. and the molten film is cured under application of ionizing radiation or ultraviolet ray, preferably while the resin is still in the molten state. Thus, the intended coating film is formed on the substrate.

In case the cross-linking curing reaction is accomplished by application of an ionizing radiation, it is preferred that 5 to 15 Mrad of an electron beam is applied at a dose rate of 0.5 to 15 Mrad per second by employing an electron accelerator having an acceleration voltage of 0.1 to 2.0 MeV. In case the cross-linking curing reaction is accomplished by application of an ultraviolet ray, it is preferred that 0.1 to 5% by weight of a benzoin type photopolymerization initiator such as benzoin and benzoin alkyl ethers, e.g., benzoin methyl ether, benzoin ethyl ether and benzoin isopropyl ether is incorporated into the powdery thermoplastic resin composition to be used in this invention and a ultraviolet ray having a wavelength of 2000 to 8000 A, especially 3000 to 5000 A, is radiated on the molten composition.

According to this invention, a coating film can be formed on various substrates. For example, the abovementioned powdery thermoplastic resinous composition is coated on various metal materials such as iron plates, aluminum plates and the like, or such substrates as woods, plastics, asbestos, glass sheets and the like.

The coating method of this invention is advantageous over the conventional coating method using an organic solvent, because an organic solvent which is not a film-forming component, or a volatile vinyl monomer need not be used and hence, the method of this invention using a completely solid composition free of a volatile component does not cause a problem of environmental pollution. Further, the method of this invention is economically advantageous over the above conventional method because neither a solvent nor a monomer is lost by evaporation.

Moreover, as compared with the conventional method in which a resinous composition including a prepolymer and a vinyl monomer is cured under application of ionizing radiations or ultraviolet rays, the method of this invention is advantageous in that no loss is brought about by evaporation of a polymerizable monomer and since a coating film is cured by the cross-linking reaction of polymerizable unsaturated bonds, no abrupt shrinkage is caused to occur at the irradiation curing step and hence, a coating film excellent in impact resistance, adhesion and chemical resistance can be obtained.

Furthermore, surprising effects not expected from the conventional coating method using a powdery resinous composition can be attained by the method of this invention. More specifically, since the curing reaction is performed by application of ionizing radiations or ultraviolet rays, no viscosity elevation is brought about at the heat-melting step and hence, voids left after release of air can easily be filled and a coating film having good surface appearance can be obtained.

Accordingly, this invention makes great contributions to the art.

This invention will now be illustrated more detailedly by reference to the following Examples which by no means limit the scope of this invention.

EXAMPLE 1

A flask equipped with an agitator, a thermometer and a condenser was charged with 3 moles of tolylene diisocyanate (2,4-tolylene diisocyanate/2,6-tolylene diisocyanate ratio being 80/20) and 3 moles of 2-hydroxyethyl methacrylate, and they were reacted under agitation at 60°C. for 2 hours. Then, 1 mole of trimethylolpropane was added to the reaction mixture, and the reaction was further continued at 80°C. for 3 hours to obtain a thermoplastic resin having 2.9 polymerizable unsaturated bonds per 1000 of the molecular weight and a melting point of about 65°C.

The so formed resin was finely divided and sieved by employing a 100-mesh sieve (maximum particle size being about 150 $\mu$), and the resulting powder was coated and heat-melted on an iron plate maintained at 110° to 120°C. according to the fluidized bed coating method, so that the resulting coating film had a thickness of 150 $\mu$, and the coating was irradiated with an ionizing radiation under the following conditions; an acceleration voltage of 250 KV, a current density of 45 mA and a radiation dose of 5 Mrad. A cured coating film having good surface appearance was obtained.

EXAMPLE 2

The finely divided resin obtained in Example 1 was mixed with 2% by weight of benzoin ethyl ether as a photopolymerization initiator, and the photopolymerization initiator was uniformly dispersed into the composition at about 80°C. Then, in the same manner as in Example 1, the composition was pulverized and heat-melted on an iron plate, and was irradiated with a ultraviolet ray emitted from a high pressure mercury lamp of 4 KW disposed 30 cm apart from the coating. By 10 seconds' irradiation, a cured coating film having good surface appearance was obtained.

EXAMPLE 3

A flask equipped with an agitator, a thermometer, a condenser and a nitrogen gas introduction tube was charged with 3.8 moles of isophthalic acid, 1.2 moles of adipic acid, 4.0 moles of neopentylglycol and 50 cc of xylene, and the mixture was heated at 200° to 210°C. under agitation while introducing nitrogen gas into the flask, water formed by esterification being distilled azeotropically while refluxing xylene. 100 parts of the so formed polyester (having an acid value of 139) was incorporated with 25 parts of glycidyl methacrylate, 0.5 part of tetraethyl ammonium bromide and 0.06 part of hydroquinone, and the reaction was conducted at 100°C. for 3 hours to obtain a thermoplastic resin having 1.4 unsaturated bonds per 1000 of the molecular weight and a molecular weight of 1450.

The resulting resin was roughly pulverized, and titanium oxide was added to the resin in an amount of 50 parts per 100 parts of the resin and hot-dispersed at about 100°C. uniformly in the resin to obtain a homogeneous blend. The blend was finely divided and sieved by employing a 300-mesh sieve (maximum particle size being about 50 μ). The resulting powdery composition was coated on an iron plate by the fluidized bed coating method so that the resulting coating film had a thickness of about 50 μ, and heat-melted at about 100°C. for 1 minute. Then, the molten resin was irradiated with an ionizing radiation in the same manner as in Example 1. A cured coating film having good surface appearance was obtained.

EXAMPLE 4

A flask equipped with an agitator, a thermometer, a condenser and a nitrogen gas introduction tube was charged with 55 parts of styrene, 30 parts of ethyl acrylate, 15 parts of glycidyl methacrylate, 2 parts of azobisisobutyronitrile and 100 parts of xylol, and the mixture were heated at 100° to 110°C. under a nitrogen gas current to complete the polymerization reaction. Then, 8 parts of acrylic acid, 0.4 part of tetramethyl ammonium bromide and 0.05 part of hydroquinone were added to the reaction mixture, and the reaction was further conducted at 100°C. for 3 hours to obtain a thermoplastic resin having a molecular weight of about 10000, a glass transition temperature of about 50°C. and 0.9 unsaturated bond per 1000 of the number average molecular weight.

The resulting resin was roughly pulverized, and titanium oxide was added to the resin in an amount of 50 parts per 100 parts of the resin. A resinous composition having a maximum particle size of about 50 μ was prepared from the blend according to the spray-drying method. The resulting composition was heat-melted and cured in the same manner as in Example 3. A cured coating film having good surface appearance was obtained.

What is claimed is:

1. A method for forming coating films which comprises coating a powdery composition of a thermoplastic resin having 0.5 to 3.5 polymerizable unsaturated bonds per 1000 of the molecular weight on an article to be coated, heat-melting the powdery resinous composition, and curing the molten film under application of ionizing radiation or ultraviolet radiation.

2. A method for forming coating films according to claim 1 wherein the thermoplastic resin is solid at room temperature and molten at 50° to 200°C.

3. A method for forming coating films according to claim 2 wherein the thermoplastic resin is molten at a temperature at 60° to 120°C.

4. A method for forming coating films according to claim 1 wherein the thermoplastic resin is a member selected from the group consisting of vinyl and acrylic polymers having polymerizable unsaturated bonds at side chains thereof, polyesters and polyethers having polymerizable unsaturated bonds at side chains or terminal ends thereof, unsaturated polyesters synthesized by employing an unsaturated polybasic acid as a main polybasic acid component, unsaturated epoxy esters synthesized from an unsaturated acid and an epoxy resin, polyurethanes synthesized by employing an unsaturated acid or unsaturated alcohol as one component, melamine resins having unsaturated bonds introduced thereinto, oil-modified unsaturated alkyd resins, oil-modified unsaturated aminoalkyd resins, and silicone-modified resins having polymerizable unsaturated bonds.

5. A method for forming coating films according to claim 1 wherein the powdery thermoplastic resinous composition has a particle size smaller than 150 μ and the powdery resinous composition is coated on the article by a fluidized bed coating method.

6. A method for forming coating films according to claim 1 wherein the powdery thermoplastic resinous composition has a particle size smaller than 100 μ and the powdery resinous composition is coated on the article by an electrostatic coating method.

7. A method for forming coating films according to claim 1 wherein a plasticizer is incorporated into the powdery thermoplastic resinous composition to reduce the melting point thereof.

8. A method for forming coating films according to claim 1 wherein the powdery thermoplastic resinous composition coated on the article is heat-molten at 50° to 200°C.

9. A method for forming coating films according to claim 1 wherein the powdery thermoplastic resinous composition coated on the article is heat-molten at 60° to 120°C.

10. A method for forming coating films according to claim 1 wherein the ionizing radiation is an electron beam.

11. A method for forming coating films according to claim 10 wherein 5 to 15 Mrad of an electron beam is radiated on the powdery thermoplastic resinous composition coated on the article at a dose rate of 0.5 to 15 Mrad per second by employing an electron accelerator having an acceleration voltage of 0.1 to 2.0 MeV.

12. A method for forming coating films according to claim 1 wherein 0.1 to 5% by weight of a photopolymerization initiator is incorporated into the powdery thermoplastic resinous composition and ultraviolet radiation having a wavelength of 2000 to 8000 A, is radiated on the powdery thermoplastic resinous composition coated on the article.

13. A method for forming coating films according to claim 12 wherein the ultraviolet radiation has a wavelength of 3000 to 5000 A.

14. A method for forming coating films according to claim 12 wherein the photopolymerization initiator is a member selected from the group consisting of benzoin, benzoin methyl ether, benzoin ethyl ether and benzoin isopropyl ether.

15. A method for forming coating films according to claim 1 wherein a pigment is incorporated into the powdery thermoplastic resinous composition.

16. A method for forming coating films according to claim 1 wherein a filler is incorporated into the powdery thermoplastic resinous composition.

17. A method for forming coating films according to claim 1 wherein said thermoplastic resin is a polyurethane of ingredients consisting of tolylene diisocyanate, 2-hydroxy-ethyl methacrylate and trimethylolpropane.

18. A method for forming coating films according to claim 1 wherein said thermoplastic resin is the reaction product of glycidyl methacrylate with a polyester of ingredients consisting of isophthalic acid, adipic acid and neopentylglycol.

19. A method for forming coating films according to claim 1 wherein the thermoplastic resin is the product of the reaction between acrylic acid and the reaction product of styrene, ethyl acrylate and glycidyl methacrylate.

* * * * *